United States Patent [19]

Chevet

[11] 4,048,388
[45] Sept. 13, 1977

[54] CELL OR BATTERY STATE OF DISCHARGE INDICATOR

[75] Inventor: Robert Chevet, St. Benoit, Poitiers, France

[73] Assignees: Saft-Societe des Accumulateurs Fixes et de Traction, Romainville; Compagnie Industrielle des Piles Electriques "CIPEL", Levallois-Perret, both of France

[21] Appl. No.: 669,870

[22] Filed: Mar. 24, 1976

[30] Foreign Application Priority Data

Apr. 10, 1975 France .............................. 75.11261

[51] Int. Cl.² .......................................... H01M 6/00
[52] U.S. Cl. ..................................................... 429/91
[58] Field of Search ................................... 429/91, 90

[56] References Cited
U.S. PATENT DOCUMENTS

| | | |
|---|---|---|
| 1,497,388 | 6/1924 | Sterling .................................. 429/91 |
| 2,980,754 | 4/1961 | Reilley et al. ........................... 429/91 |
| 3,563,806 | 2/1971 | Hruden ................................... 429/90 |
| 3,773,563 | 11/1973 | Eaton et al. ............................ 429/91 |

Primary Examiner—Donald L. Walton
Attorney, Agent, or Firm—Kenyon & Kenyon, Reilly, Carr & Chapin

[57] ABSTRACT

The invention relates to a discharge indicator of an electrochemical generator such as a cell or battery comprising a consumable negative electrode basically containing powdered metal, for example, zinc. The said indicator is constituted by an enclosure containing a substance which can be seen from the outside of the battery and having an appearance which changes on coming into contact with the electrolyte, the said enclosure being closed by a metal plate arranged within the negative electrode and which is made of a material chosen from among zinc, zinc alloys, zinc amalgams. Application of the indicator is to air depolarization cells.

14 Claims, 3 Drawing Figures

U.S. Patent
Sept. 13, 1977
4,048,388
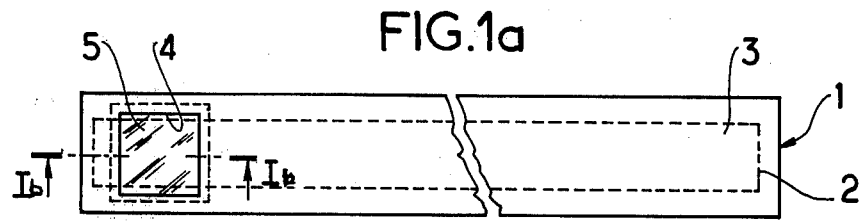
FIG.1a
FIG.1b
FIG.2
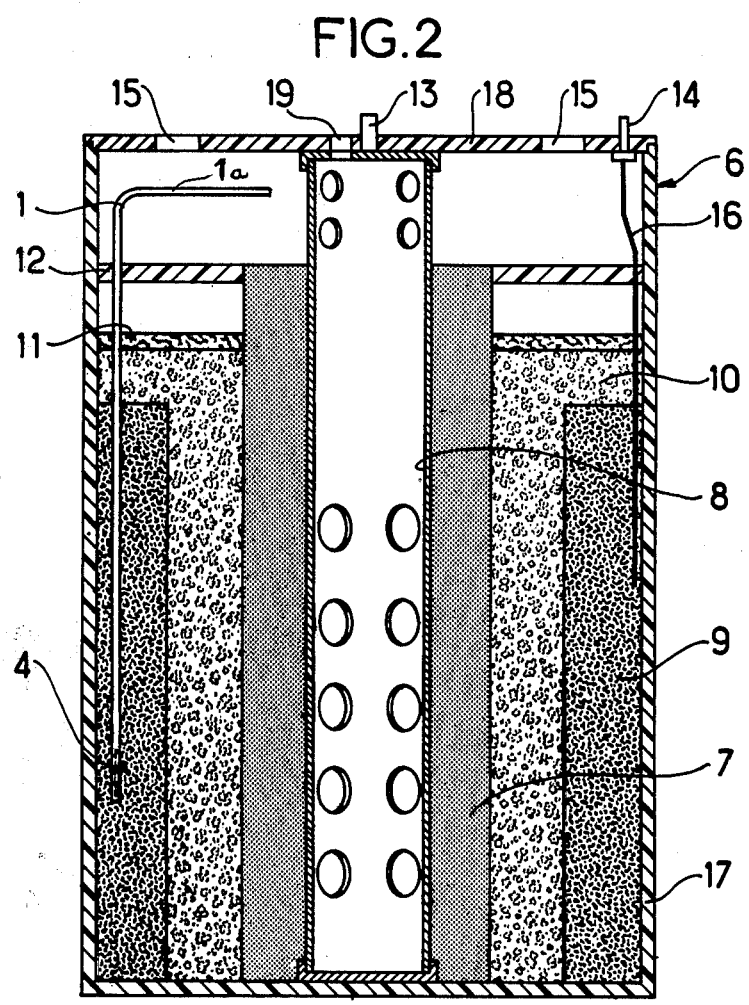

CELL OR BATTERY STATE OF DISCHARGE INDICATOR

The present invention concerns an indicator of the state of discharge of an electrochemical generator such as an electric cell or battery and, more particularly, of a cell or battery whose negative electrode is constituted by a powdered metal such as zinc, magnesium, etc.

The usefulness of such an indicator is evident and extensive research has already been made to provide such a device. It has been proposed to arrange, on the outside of the negative electrode, a substance which changes appearance into contact with the electrolyte. But on the other hand, such an indicator can be used only with cells or batteries whose negative electrode is in the form of a compact metal (for example, a zinc cup) and on the other hand, the indication is given only when the cup becomes perforated and hence only when the electrolyte is in danger of escaping from the cell or battery.

For cells or batteries in which the negative electrode is constituted by a powdered metal, contingently supported in an electrolytic gell, it has been proposed to follow the discharge front by observing the change in colour of the negative active material itself. But this implies that the discharge front progresses parallel to the cell or battery wall in which the window formed therein enables that progress to be followed or viewed. In cells or batteries where the positive electrode is situated at the center and is surrounded by the negative electrode, it is practically impossible to design such a device, because of the necessary protection of the negative electrode against the direct ingress of air thereto.

The present invention is intended to overcome those disadvantages.

It has among its objects an indicator of the state of discharge of an electrochemical generator as a cell or battery comprising a positive electrode, an electrolyte and a negative electrode basically containing a first consumable powdered metal, characterized in that it consists of a transparent enclosure or envelope containing a substance which is visible from the outside of the cell or battery and whose appearance, (e.g. color) changes on coming into contact with the said electrolyte, the said enclosure being sealed by a consumable closing means made of a second metal having the same electrochemical behavior as the said first metal.

That indicator is placed in the cell or battery, its closing means being located within the negative electrode and a part of the enclosure being arranged in a part of the battery such that the substance within the enclosure will be visible from the outside. When the discharge front of the negative electrode reaches the closing means of the enclosure, the said second metal thereof is consumed at the same time as the metal of the negative electrode of the cell or battery and the seal of the enclosure is broken and the electrolyte enters the interior of the enclosure, causing a change in appearance of the substance contained therein. Thus, there is a visual warning of the position of the discharge front of the cell or battery and arrangements can contingently be made for its replacement before the end of its discharge.

Of course, the metal for sealing or closing off the enclosure may be of the same metal as the negative electrode or one having analagous chemical properties such as an alloy or amalgam of said metal.

An application for the invention which constitutes a particular advantage can be found in high-capacity air depolarization cells or batteries.

This invention will be better understood by reference to the following examples in relation to the accompanying drawings, in which:

FIG. 1a is an elevation view of an embodiment of an indicator according to the invention;

FIG. 1b is a detailed enlarged scale view of the indicator in FIG. 1a taken along the line Ib—Ib of FIG. 1a; and FIG. 2 is a sectional view of an air depolarization cell to which an indicator according to the invention has been applied.

In FIG. 1, the reference symbol 1 designates an indicator according to the invention. It consists of a strip 2 of pH indicator paper (e.g. litmus paper) enclosed in a flat tubular sheath 3 made of transparent plastic material, that sheath being sealed in a fluid-tight manner, but comprising a rectangular opening 4 on a face adjacent one end of the strip 2. That opening 4 is also closed in a fluid-tight manner by a plate 5 of zinc, zinc alloy or zinc amalgam which can, for example, be glued to the inner face along the perimeter of opening 4 of the sheath. The substance 2 is a pH indicator. Its appearance changes preferably at a pH greater than seven.

FIG. 2 shows an air depolarization alkaline electrolyte cell or battery 8. The positive electrode 7 made of porous agglomerated carbon comprises at its center, an aeration funnel delimited by a perforated metal tube 8 which acts, at the same time, as a current collector and is in electrical connection with the positive current output terminal 13. The positive electrode 7 is separated from the negative electrode 8 by a layer of electrolyte 10 made of a gelled potassium hydroxide solution. The negative electrode 9 is constituted by a suspension of zinc powder in a gelled potassium hydroxide solution whose concentration can be the same as that of the electrolyte 10. A metallic collector 16 constituted for example, by a copper wire, is immersed in the negative electrode and is connected to the negative current output terminal 14. The layer of electrolyte 10 is protected at its upper portion by a covering sealing layer of pitch 11 to avoid any carbonating during storage. That protective layer is reinforced by a cardboard or plastic washer 12 to prevent the ingress of air to the electrolyte otherwise than through the positive electrode. The components of the cell or battery are enclosed in an insulating can or container 17 closed off by a cover 18 of like material having openings at 15 and 19 for the admission of air to the inside of the cell or battery, the opening 19 communicating with the inside of the perforated tube 8 in the case where means for speeding up the circulating of the air are provided.

As will be seen in FIG. 2, the indicator 1 is arranged in such a way that its opening 4 sealed by the plate 5 is immersed in the negative mass 9 at a location such that the discharge front of this mass reaches it at the moment of discharge state which is to be detected. For example, if it is required to know the moment when the battery is three quarters discharged, the plate 5 must be at a distance from the inner face of the negative electrode 9 which is in the vicinity of the electrolyte 10 equal to three quarters of the thickness of electrode 9. The upper part of the indicator 1 is folded over at 1a and situated under one of the openings 15 so that it is visible from the outside of the cell or battery. The indication is all the more reliable as the discharge front is more regular, this corresponding to discharge rates which are not too high. When the closure plate 5 is consumed and perforated by oxidation at the moment when the discharge front has reached it, the electrolyte entering inside the sheath 3 makes the strip of paper 2 in envelope or sheath 3 change color, firstly at its lower part and then, as the alkaline electrolyte rises by capillarity in the indicator paper 2, the change in color of said substances progresses throughout the whole length of the strip until it becomes visible externally in portion 1a of indicator 1 via an opening 15. The rising time of the electrolyte in strip 2 is generally negligible with respect to the discharge time of the battery. Thus with a discharge rate of certain types of battery in 10 to 12 days, this being considered as high, it is evident that the rising of the electrolyte over a strip length of 10 cm in 23 minutes does contribute an appreciable error in the estimation of the depth of the discharge. Nevertheless, in order to reduce the rising time of the electrolyte, the lower part of the strip of indicator paper 2 can be replaced by a portion of more absorbent material such as a cellulosic or plastic felt of the type conventionally used as a cell separator, contingently coated with carboxymethylcellulose to increase its wettability.

Several indicators similar to indicator 1 can be arranged in a cell or battery at different depths and thickness of the negative electrode 9 so as to follow the discharge of the cell or battery. To distinguish the respective indicators, it is possible either to locate them in different positions (each being, for example, in front of a different opening 15), or else to use different substances in their papers 2 respectively producing different changes in color when their pH changes as electrolyte comes into contact therewith.

It must be understood that the preceding examples must not be taken as having a limited character. Variation within the scope of the appended claims is possible and is contemplated. It is, more particularly, possible to replace the zinc of the plate 5 by another metal having analogous chemical properties, for example a zinc alloy or a zinc amalgam. There is, therefore, no intention of limitation to the exact disclosure herein presented.

What is claimed is:

1. Electrochemical generator comprising a positive electrode, an electrolyte, a negative electrode basically containing a first consumable powdered metal and an indicator of the state of discharge of an electrochemical generator comprising a positive electrode, an electrolyte and a negative electrode basically containing a first consumable powdered metal, characterized in that said indicator comprises a sealed transparent enclosure containing a substance which is externally visible and whose appearance changes on coming into contact with the said electrolyte, the said enclosure being sealed by closure means made of a second metal having the same electrochemical behavior as the said first metal.

2. Generator according to claim 1, characterized in that the said first-named metal is zinc.

3. Generator according to claim 1, characterized in that the second metal is the same as the first-named metal.

4. Generator according to claim 1, characterized in that the said second metal is selected from the group consisting of zinc, an amalgam of zinc and an alloy of zinc.

5. Generator according to claim 1, characterized in that the said substance is a pH indicator whose appearance changes at a pH greater than 7.

6. Generator according to claim 1, characterized in that the said enclosure is a sheath made of transparent plastic material which will not be corroded by active materials of the generator, said sheath having an opening sealed by said closure means, said closure means being a plate of the said second metal.

7. Generator according to claim 1, including a porous support in said enclosure, said enclosure including a closing means characterized in that the said substance is disposed in said porous support which is very absorbent.

8. Generator according to claim 7, characterized in that the said substance is disposed in said porous support, said support being located at the opposite end of the enclosure from its closing means and that the remainder of the enclosure is filled with a markedly absorbent material.

9. Electrochemical generator comprising a positive electrode, an electrolyte, a negative electrode of consumable powdered metal and state of discharge indicator means for said generator, said means comprising a sealed transparent enclosure, a substance contained within said enclosure which is visible externally of said generator and whose appearance changes on contact with said electrolyte, said enclosure having an opening, closure means sealing said opening and being of a second metal having the same electrochemical behavior as said first-named metal, said closure means of said enclosure being positioned in said negative electrode at a selected position and the substance in said enclosure being positioned to be visible externally of said generator for observation of its appearance which changes when the seal by said closure means is broken and electrolyte gains access through said opening to said substance.

10. Electrochemical generator according to claim 9 wherein said enclosure is a sheath of transparent material unaffected by generator content, and said closure means is a plate sealingly secured around the said opening.

11. Electrochemical generator according to claim 9 wherein said substance is a pH indicator whose appearance changes at a pH greater than 7.

12. Electrochemical chemical generator according to claim 9 wherein said negative electrode is of powdered zinc and said closure means is zinc containing so as to have the same electrochemical behavior as said negative electrode.

13. Electrochemical generator according to claim 9 including a container for said electrodes and electrolyte and a cover for said container having an opening, said enclosure means having a portion underlying said opening and containing in said portion said substance for visual observation via said opening, the visual appearance of said substance via said opening as affected by contact with said electrolyte serving to indicate the state of discharge of said generator.

14. Electrochemical generator according to claim 9 wherein said closure means of said enclosure is positioned in said negative electrode at a selected distance from said electrolyte.

* * * * *